April 3, 1956   G. A. BRUNDRETT ET AL   2,740,500
SHOCK ABSORBER
Filed June 29, 1951
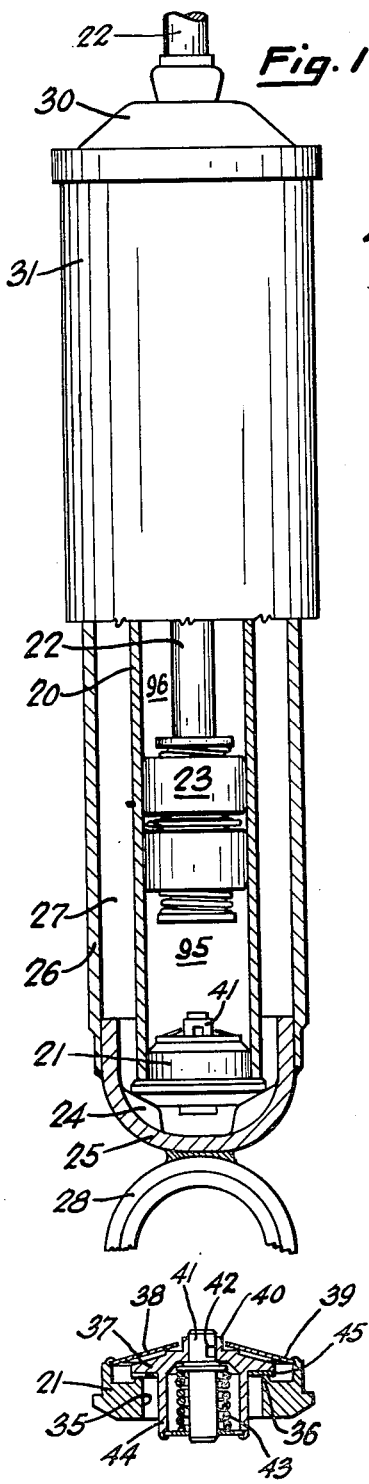
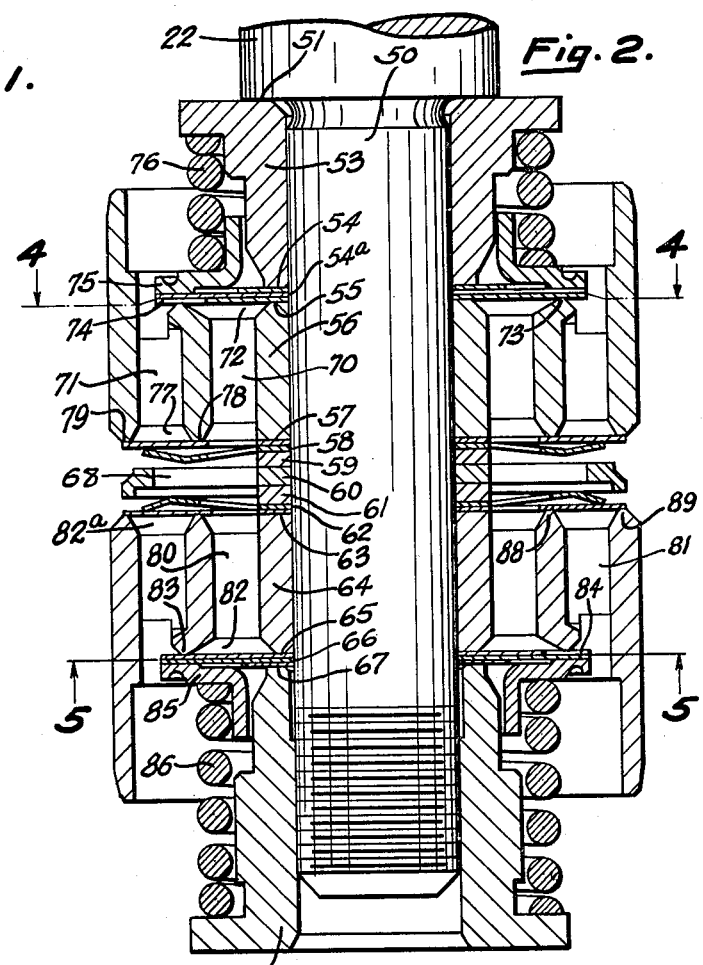
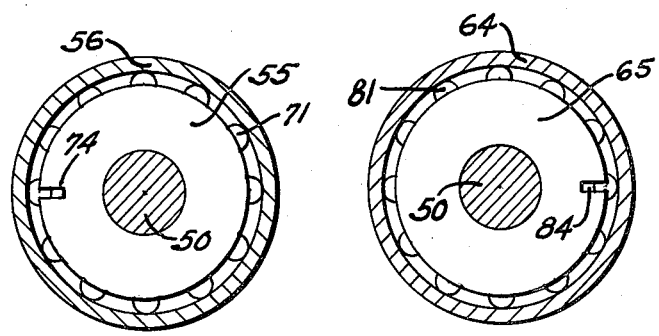
INVENTORS
MEARICK FUNKHOUSER &
GEORGE A. BRUNDRETT
BY
Willits, Hardman & Fehr
THEIR ATTORNEYS.

United States Patent Office 2,740,500
Patented Apr. 3, 1956

2,740,500

SHOCK ABSORBER

George A. Brundrett and Mearick Funkhouser, Dayton, Ohio, assignors to General Motors Corporation, Detroit, Mich., a corporation of Delaware Application June 29, 1951, Serial No. 234,204

2 Claims. (Cl. 188—88)

This invention relates to improvements in fluid flow control mechanism for hydraulic shock absorbers, particularly of the direct acting type.

It is among the objects of the present invention to provide fluid displacement control mechanism for a direct acting type hydraulic shock absorber said mechanism consisting of a reciprocative fluid displacement member having fluid transfer passages and fluid flow control devices therefor which regulate fluid transfer within the shock absorber in accordance with the speed and amplitude of the reciprocation.

Further objects and advantages of the present invention will be apparent from the following description, reference being had to the accompanying drawings wherein a preferred embodiment of the present invention is clearly shown.

In the drawings:

Fig. 1 is a fragmentary, sectional view of a direct acting type, hydraulic shock absorber equipped with the present invention.

Fig. 2 is a detail, sectional view, at enlarged scale, of the fluid displacement element constructed in accordance with the present invention.

Fig. 3 is a detail, sectional view of the fluid flow control mechanism provided at one end of the working cylinder.

Fig. 4 is a transverse section, at reduced scale, taken along the line and in the direction of the arrows 4—4 in Fig. 2.

Fig. 5 is a similar section taken along the line and in the direction of the arrows 5—5 in Fig. 2.

Referring to the drawings, the shock absorber is shown comprising a working cylinder 20 provided with a closure member 21 at its one end. As is customary in shock absorbers of this type, the other, upper end of cylinder 20 has a closure member, not shown, through which the rod 22 of the fluid displacement member 23 slidably extends. The closure member 21 rests upon spaced, radial ribs 24 in the end cup 25 which is telescopically engaged by one end of tube 26 secured to said cap in any suitable manner, preferably by welding to avoid leaks. This tube 26 encompasses the working cylinder 20 forming an annular space 27 around it which provides the fluid reservoir in communication with the outer end of the closure member 21. As is customary, the upper closure member, not shown, is telescopically engaged by the other end of tube 26, thus holding the cylinder 20 and tube 26 substantially concentric. The end of rod 22 extending outside the cylinder 20 has a cap 30 attached thereto which carries tube 31 surrounding tube 26 for a portion of its length and providing a guard therefor. Cap 25 has a mounting ring 28 attached thereto, said ring providing means for attachment of the shock absorber to the vehicle axle, a similar ring being provided at the outer end of rod 22 for attachment to the vehicle body.

The cylinder closure member 21 forms the cage for oppositely acting fluid flow control devices which regulate the transfer of fluid between the cylinder and reservoir in either direction as the fluid displacement member 23 is reciprocated. Fig. 3 shows the member or cage 21 as having a central opening 35 surrounded on the cylinder side of the cage by an annular ridge forming the seat 36 for the disc valve 37, urged upon its seat by the resilient fingers 38 radially extending from a ring 39 which is secured in said cage. The disc valve 37 is centrally apertured and provided with a tubular extension 40 in which the plug valve 41 is slidably supported. The portion of the plug valve 41 in said extension 40 of the disc valve is recessed at its end and a side opening 42 in the wall of the recess is normally within the confines of the central opening in the disc valve thereby being normally closed. An annular flange on the plug valve is normally held against the inner wall of the disc valve by a spring 43 interposed between the flange of the plug valve 41 and an abutment washer supported in a tubular extension 44 of the disc valve 37. In some installation requirements a constantly open orifice is provided in the disc valve 37. This orifice is most economically provided by the application of a seating washer 45 on the face of the disc valve 37 contiguous to the valve seat 36, said washer having an orifice of predetermined size provided in it.

The fluid displacement member 23 of the shock absorber forms the subject matter of this invention. This member consists of two separate plugs or pistons mounted on a reduced diameter portion 50 of rod 22 and reciprocated in cylinder 20 by said rod. The annular shoulder 51 is provided on the rod by the reduced diameter portion. All of the following elements of the displacement member 23 fit about rod portion 50 and clamped together in the following superposed relation between the shoulder 51 on the rod and the clamping nut 52 threaded to said rod: first a spacer collar 53 directly engages the shoulder 51, next the backing plates 54 and 54a, the resilient control disc valve 55, the piston 56, check valve 57 in the form of a resilient disc, backing spring disc 58, spacer collar 59, rigid backing disc 60, spacer collar 61, backing spring disc 62, resilient spring, disc valve 63, piston 64, resilient control disc valve 65, its backing discs 66 and 67 directly engaged by the inner end of the clamping nut 52. Thus the resilient disc valves 55, 57, 63 and 65, centrally apertured to fit about rod portion 50, are clamped tightly at their inner annular edge portions. The pistons 56 and 64 are securely mounted on said rod portion 50 in spaced relation with the rigid backing disc 60 interposed therebetween.

Each piston 56 and 64 has a plurality of fluid transfer passages arranged in concentric inner and outer annular rows. Piston 56 has passages 70 in its inner annular row and passages 71 in its outer annular row. An annular groove 72 in the outer end surface of piston 56 connects with all passages 70 and is surrounded by an annular ridge 73 providing a seat engaged by the control disc valve 55 which normally closes said passages 70 with the exception of a constantly open, predeterminately sized orifice 74 formed by a notch or opening in said valve 55. This valve is moved by the pressure collar 75 and yieldably urged upon the piston seat 73 by spring 76 interposed between said collar and an annular flange on spacer collar 53. Passages 71 in the outer annular row in piston 56 have their corresponding ends connected together by an annular groove 77 surrounded at both inner and outer edges by annular ridges 78 and 79 respectively, which provide seats engaged by the resilient disc check valve 57 which is urged upon said seats 78 and 79 by the backing spring disc 58 for normally closing said passages 71. The rigid backing plate 60 limits the flexing of valve 57 by fluid pressure in passages 71.

Piston 64 is substantially identical with piston 56. The passages 80 in the inner annular row in said piston are connected together by an annular groove 82 in the outer end surface of said piston. An annular ridge 83 on the piston surrounds the groove 82 and provides a seat for the resilient control disc valve 65, the backing disc 66 of which is engaged at its outer peripheral edge by the pressure collar 85, thus valve 65 is yieldably urged upon its seat under the effect of spring 86 interposed between the pressure collar 85 and a flange on the nut 52. Valve 65 normally closes passage 80 with the exception of a constantly open orifice provided by the notch or opening 84 in valve 65. Passages 81 in the outer annular row in piston 64 have their corresponding ends connected by groove 82a which is surrounded on both sides by annular ridges 88 and 89 forming valve seats for the disc check valve 63 urged upon said seats by the resilient backing disc 62. The backing disc 58 and disc valve 57 on piston 56 are apertured constantly to maintain passages 70 in piston 56 open at the inner end of the piston and likewise backing disc 62 and its engaged valve 63 are apertured to keep open the inner ends of passages 80 whose opposite ends are covered by valve 65.

A shock absorber as illustrated in Fig. 1, when secured between the frame and axle of a vehicle operates in the following manner: when the vehicle axle is thrust upwardly toward the frame of the vehicle in response to the road wheels of the vehicle striking a bump in the roadway, the cap 25, cylinder 20 and tube 26 are moved relatively to the fluid displacement member 23 so that the latter approaches the cylinder closure member 21. This exerts pressure upon the fluid within the lower working chamber 95 in the cylinder while the upper working chamber 96, through which rod 22 extends, is being enlarged. In response to this movement of member 23, fluid from chamber 95 will first flow through the constantly open orifice at disc valve 37, through the valve cage 21 into the reservoir 27. Fluid from chamber 95 will also act through passages 81 against the valve 63, held upon piston 64 with comparatively light pressure, and move said valve to establish a fluid flow past valve 63 around the backing disc 60 and through openings 68 therein, this fluid under pressure then entering the inner row passages 70 in piston 56 by passing through apertures in the check disc valve 57 and its resilient backing spring disc 58 on piston 56. Fluid in passages 70 of piston 56 will first pass through the orifice 74 in the control valve 55 covering said passages, said orifice restricting fluid flow through piston 56 whereby relative movement between the displacement member 23 and cylinder 20 is resisted and consequently the shock resists movement of the axle toward the vehicle body. If the fluid pressure within piston passages 70 is of such a degree that it cannot properly be relieved by the flow through orifice 74, then valve 55 is flexed against the opposing effect of spring 76 to move off the piston seat 73 and establish a pressure relieving fluid flow past valve 55 into the upper working chamber 96. At no time during the movement of the displacement member 23 toward the cylinder closure member 21 will the check valve 57 open the outer row of passages 71 in piston 56 and therefore no fluid flow will be established through these passages during such movements of said member.

The upper chamber 96, due to the presence of the rod 22 therein, is not capable of receiving all of the fluid displaced from the lower chamber 95 as the displacement member moves toward the closure member or valve cage 21 and therefore the fluid displaced by said rod 22 is forced through the valve cage 21 into the reservoir 27. If the orifice in valve 37 cannot properly relieve this flow, plug valve 41 is actuated by the fluid pressure to move the side opening 42 outside the confines of the central opening in valve 37 so that a restricted fluid flow is established through the plug valve into the reservoir, thereby causing the shock absorber to provide the proper resistance to axle movements under these conditions.

When the displacement member 23 is moved in the opposite direction, that is, away from the closure member 21, due to separating movements of the vehicle frame and axle under the influence of the vehicle springs, pressure is exerted upon the fluid in the upper cylinder chamber 96. With piston 56 acting as the leading and piston 64 as the trailing portion of the displacement member 23, fluid will flow under pressure, through the outer row of piston passages 71 in piston 56, move the lightly spring loaded valve 57 off the seats 78—79, thereby establishing a substantially unrestricted flow through piston 56 into the inner row of piston passages 80 in piston 64, the outer row of passages 81 in said piston 64 being closed by valve 63. A constantly restricted fluid flow from passage 80 is initially established by the orifice 84 in valve 65 which will be flexed from its seat 83 on piston 64 to establish a restricted flow through piston 64 into the lower chamber 95 in response to an increase in fluid pressure not relievable by the orifice 84. This causes the shock absorber to provide proper resistance to separating movements of the vehicle frame and axle.

The fluid requirements of the expanding chamber 95 cannot be met by the fluid discharged from the lesser capacity, rod containing chamber 96 and therefore valve 37 will be actuated to provide the required additional fluid supply from the reservoir 27, said fluid flowing substantially unrestricted through the valve cage 21 into chamber 95.

The present fluid displacement member 23 with its double piston construction provides a unique fluid transfer control mechanism in which only the orifice and spring loaded valve of the trailing piston member are rendered effective to provide restrictions to fluid transfer between the working chambers 95 and 96, the leading piston merely acting as a fluid delivery element to the controlling, trailing piston in either direction of displacement member movement. Each trailing piston is equipped first to establish a predetermined constant restriction to fluid transfer through an orifice and, when fluid pressure increases so that it cannot properly be relieved by the orifice, a spring loaded valve becomes effective to establish a restricted pressure relieving fluid flow in response to and in accordance with the increasing fluid pressure. These orifices and spring loaded valves in the piston members of the displacement member 23 may be so constructed and arranged to provide the necessary restrictions to fluid transfer in either direction so that the shock absorber may resist separating and approaching movements if the vehicle frame and axle to provide the desired riding qualities for the vehicle under all road conditions and operating speeds.

While the embodiment of the present invention as herein disclosed constitutes a preferred form, it is to be understood that other forms might be adopted.

What is claimed is as follows:

1. A fluid flow control mechanism for an hydraulic shock absorber, including in the combination, a cylinder, a fluid displacement member in said cylinder comprising two separate pistons carried on one end of a solid rod in spaced superposed relation, a rigid apertured plate carried by the rod between the pistons, each of said pistons having a plurality of through passages arranged in two concentric annular rows, a separate valve yieldably urged against each of the adjacent inner ends of the respective pistons and normally closing the piston passages in the outer annular row while constantly maintaining open the passages in the inner annular rows of the pistons, said valves being interposed between said plate and the piston engaged thereby with said plate providing a limit for movement of the said valves, a control valve yieldably urged against the outer end of each piston and covering the inner annular row of passages in the piston and having a constantly open predeterminately sized orifice in each control valve for controlled flow of fluid through the said inner row of passages; and a spring loaded abutment ring urging each control valve upon the respective piston whereby each control valve is operative first to provide a constant restriction through the said orifice and then a variable restriction to fluid flow upon lifting of the valve from the piston.

2. A fluid flow control mechanism for an hydraulic shock absorber, including in the combination, a cylinder, a fluid displacement member in said cylinder comprising two separate pistons carried on one end of a solid rod in spaced superposed relation, a rigid apertured plate carried by the rod between the pistons, each of said pistons having a plurality of through passages arranged in two concentric annular rows, a separate valve yieldably urged against each of the adjacent inner ends of the respective pistons and normally closing the piston passages in one of the annular rows while constantly maintaining open the passages in the other of the annular rows of the pistons, said valves being interposed between said plate and the piston engaged thereby with said plate providing a limit for movement of the said valves, a control valve yieldably urged against the outer end of each piston and covering the said other annular row of passages in the piston and having a constantly open predeterminately sized orifice in each control valve for controlled flow of fluid through the said other row of passages; and a spring loaded abutment ring urging each control valve upon the respective piston whereby each control valve is operative first to provide a constant restriction through the said orifice and then a variable restriction to fluid flow upon lifting of the valve from the piston.

References Cited in the file of this patent

UNITED STATES PATENTS

| | | |
|---|---|---|
| 2,159,289 | Nickelsen | May 23, 1939 |
| 2,191,636 | Walker | Feb. 27, 1940 |
| 2,225,986 | Glezen | Dec. 24, 1940 |
| 2,324,058 | Boor et al. | July 13, 1943 |
| 2,327,295 | Whisler | Aug. 17, 1943 |